United States Patent [19]
Maeda et al.

[11] Patent Number: 5,298,359
[45] Date of Patent: Mar. 29, 1994

[54] PHOTOSENSITIVE HEAT-RESISTANT POLYMER HAVING HYDROXYPHENYL GROUP FOR FORMING A PATTERNED IMAGE

[75] Inventors: Hirotoshi Maeda, Kanagawa; Kouichi Kunimune, Chiba, both of Japan

[73] Assignee: Chisso Corporation, Tokyo, Japan

[21] Appl. No.: 693,008

[22] Filed: Apr. 29, 1991

[30] Foreign Application Priority Data

May 10, 1990 [JP] Japan .................................. 2-118805

[51] Int. Cl.$^5$ ...................... G03F 7/012; G03F 7/037
[52] U.S. Cl. ..................................... 430/197; 430/167; 430/281; 430/288; 430/906; 525/434; 525/436; 528/353
[58] Field of Search ............... 430/197, 192, 193, 165, 430/281, 280, 283, 288; 528/353, 350, 329.1; 525/436, 434, 420

[56] References Cited

U.S. PATENT DOCUMENTS

| | | | |
|---|---|---|---|
| 3,316,212 | 4/1967 | Angelo et al. | 525/436 |
| 4,395,527 | 7/1983 | Berger | 430/189 |
| 4,547,455 | 10/1985 | Hiramoto et al. | 430/281 |
| 4,551,522 | 11/1985 | Fryd et al. | 528/351 |
| 4,701,300 | 10/1987 | Merrem et al. | 430/281 |
| 4,830,953 | 5/1989 | Bateman | 430/197 |
| 4,927,736 | 5/1990 | Mueller et al. | 430/275 |
| 5,098,814 | 3/1992 | Tunney et al. | 430/281 |

FOREIGN PATENT DOCUMENTS

0348092 12/1989 European Pat. Off. ................. 7/10

Primary Examiner—Charles L. Bowers, Jr.
Assistant Examiner—John S. Chu
Attorney, Agent, or Firm—Leydig, Voit & Mayer

[57] ABSTRACT

A photosensitive polymer containing a repeating unit represented by the following formula (I) and having a logarithmic viscosity number of from 0.1 to 5 dl/g as measured in a solvent at a temperature of 30°±0.01° C. at a concentration of 0.5 g/dl:

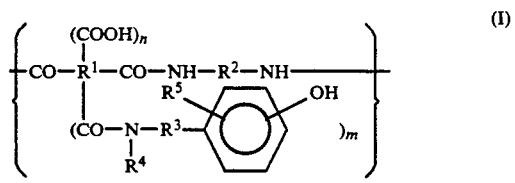

(wherein $R^1$ is a trivalent or tetravalent carbocyclic aromatic group or heterocyclic group, $R^2$ is an aliphatic group having at least two carbon atoms, an alicyclic group, an aromatic aliphatic group, a carbocyclic aromatic group, a heterocyclic group or a polysiloxane group, $R^3$ is a divalent organic group, $R^4$ is

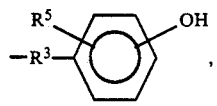

a hydrogen atom or a monovalent organic group, $R^5$ is a hydrogen atom or a monovalent organic group, m is independently 1 or 2, n is independently 0 or 1, and m and n meet $1 \leq m+n \leq 2$); a method for preparing the above-mentioned photosensitive polymer; a photosensitive polymer composition containing the above-mentioned photosensitive polymer; and a method for preparing a poly(amide)imide film.

18 Claims, 2 Drawing Sheets

PHOTOSENSITIVE HEAT-RESISTANT POLYMER HAVING HYDROXYPHENYL GROUP FOR FORMING A PATTERNED IMAGE

BACKGROUND OF THE INVENTION (i) Field of the Invention

The present invention relates to a novel photosensitive heat-resistant polymer and a method for preparing the same. More specifically, it relates to a novel high-sensitivity photosensitive poly(amide)imide precursor having an excellent shelf stability, a method for preparing the same, a photosensitive polymer composition containing the same, and a method for forming a patterned poly(amide)imide film by the use of the same.

(ii) Description of the Related Art

Photosensitive polyimides which are heat-resistant photosensitive materials have been widely used as insulating films and passivation films for semiconductors, but these polyimides have various problems.

For example, Japanese Patent Application Laid-open No. 54-145794 suggests a method for mixing a compound containing a double bond and an amino group or its quaternary salt with a polyamic acid, but the change in the viscosity of the resultant solution inconveniently increases with time, since the compound containing a large amount of the amino group or its quaternary salt is added to the unstable polyamic acid solution. Japanese Patent Application Laid-open Nos. 55-45746 and 60-100143 suggest methods for reacting an unsaturated epoxy compound or an isocyanate compound having a double bond with the carboxyl group of various polyamic acids. However, when the photosensitive unsaturated group-containing compound is reacted with the carboxyl group of the polyamic acid, a part of the polyamic acid, for example, decomposes, so that the viscosity of the solution changes inconveniently. In Japanese Patent Application Publication No. 55-41422, there is suggested a polymer obtained by introducing an active functional group such as a double bond into the ester side chain of the polyamic acid, but when an acid chloride is reacted with a diamine, the chloride remains as an impurity, and the removal of this impurity is troublesome. Furthermore, Japanese Patent Application Laid-open No. 60-6729 suggests that a diamine having a double bond is previously synthesized and a polyimide is then synthesized by using the diamine, but a process for introducing the photosensitive functional group is intricate and a large cost is required.

As is apparent from the foregoing, conventional techniques have various problems, and it is desired to develop a photosensitive material by which the above-mentioned problems can be solved.

SUMMARY OF THE INVENTION

An object of the present invention is to provide a novel photosensitive poly(amide)imide precursor having an excellent shelf stability and a good sensitivity, containing less impurities, and permitting the same to be easily manufactured; a method for preparing the same; a photosensitive polymer composition containing the same; and a method for forming a patterned poly(amide)imide film by using the same.

The first aspect of the present invention is directed to a photosensitive polymer containing a repeating unit represented by the following formula (I) and having a logarithmic viscosity number of from 0.1 to 5 dl/g as measured in a solvent at a temperature of 30°±0.01° C. at a concentration of 0.5 g/dl:

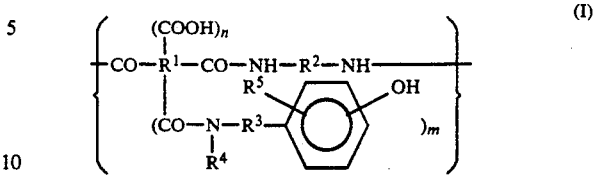

(wherein $R^1$ is a trivalent or tetravalent carbocyclic aromatic group or heterocyclic group, $R^2$ is an aliphatic group having at least two carbon atoms, an alicyclic group, an aromatic aliphatic group, a carbocyclic aromatic group, a heterocyclic group or a polysiloxane group, $R^3$ is a divalent organic group, $R^4$ is

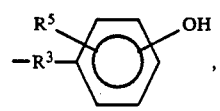

a hydrogen atom or a monovalent organic group, $R^5$ is a hydrogen atom or a monovalent organic group, m is independently 1 or 2, n is independently 0 or 1, and m and n meet the relationship $1 \leq m+n \leq 2$).

The second aspect of the present invention is directed to a method for preparing a photosensitive polymer which comprises the step of reacting a compound having a repeating unit represented by the formula (II) with a compound having a repeating unit represented by the formula (III) or a poly(amide)isoimide containing both the groups with a hydroxyphenyl group-containing amine represented by the formula (IV) at a temperature of from 0° to 100° C.:

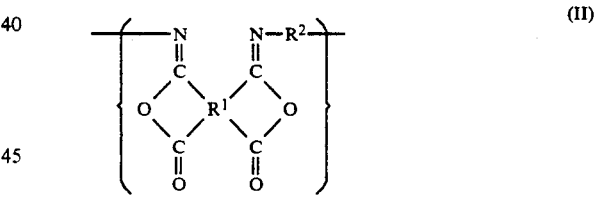

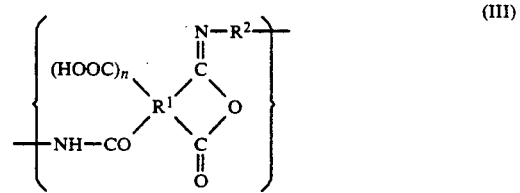

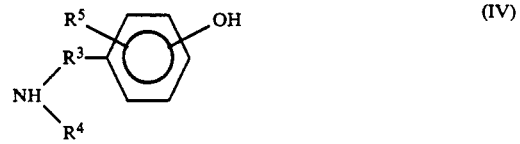

(wherein $R^1$, $R^2$, $R^3$, $R^4$, $R^5$, m and n are as defined above).

The third aspect of the present invention is directed to a photosensitive polymer composition comprising the following components (a), (b), (c) and (d) and a solvent:

(a) a photosensitive polymer described in the above-mentioned first aspect, (b) a photopolymerization initiator or a sensitizer in an amount of from 0 to 20% by weight based on the weight of the above-mentioned photosensitive polymer, (c) a azide compound in an amount of from 0.1 to 50% by weight based on the weight of the above-mentioned photosensitive polymer, and (d) a compound having a carbon-carbon double bond in an amount of from 0 to 10% by weight based on the weight of the above-mentioned photosensitive polymer.

The fourth aspect of the present invention is directed to a method for forming a patterned poly(amide)imide film which comprises the steps of coating a substrate with the above-mentioned photosensitive polymer composition, prebaking the composition at a temperature of from 30° to 150° C., irradiating it with an actinic radiation through a mask, developing, drying, and postbaking it at a temperature of from 200° to 500° C.

The photosensitive polymer of the present invention having the repeating unit represented by the formula (I) is a photosensitive polyamide-imide precursor in which m=1 and n=0, and a photosensitive polyimide precursor both in the case of m=n=1 and in the case of m=2 and n=0.

BRIEF DESCRIPTION OF THE DRAWINGS

In FIG. 2, absorptions attributed to an imido group appear intensively at 1780 cm$^{-1}$ and 720 cm$^{-1}$.

DETAILED DESCRIPTION OF PREFERRED EMBODIMENTS

Figure 1:
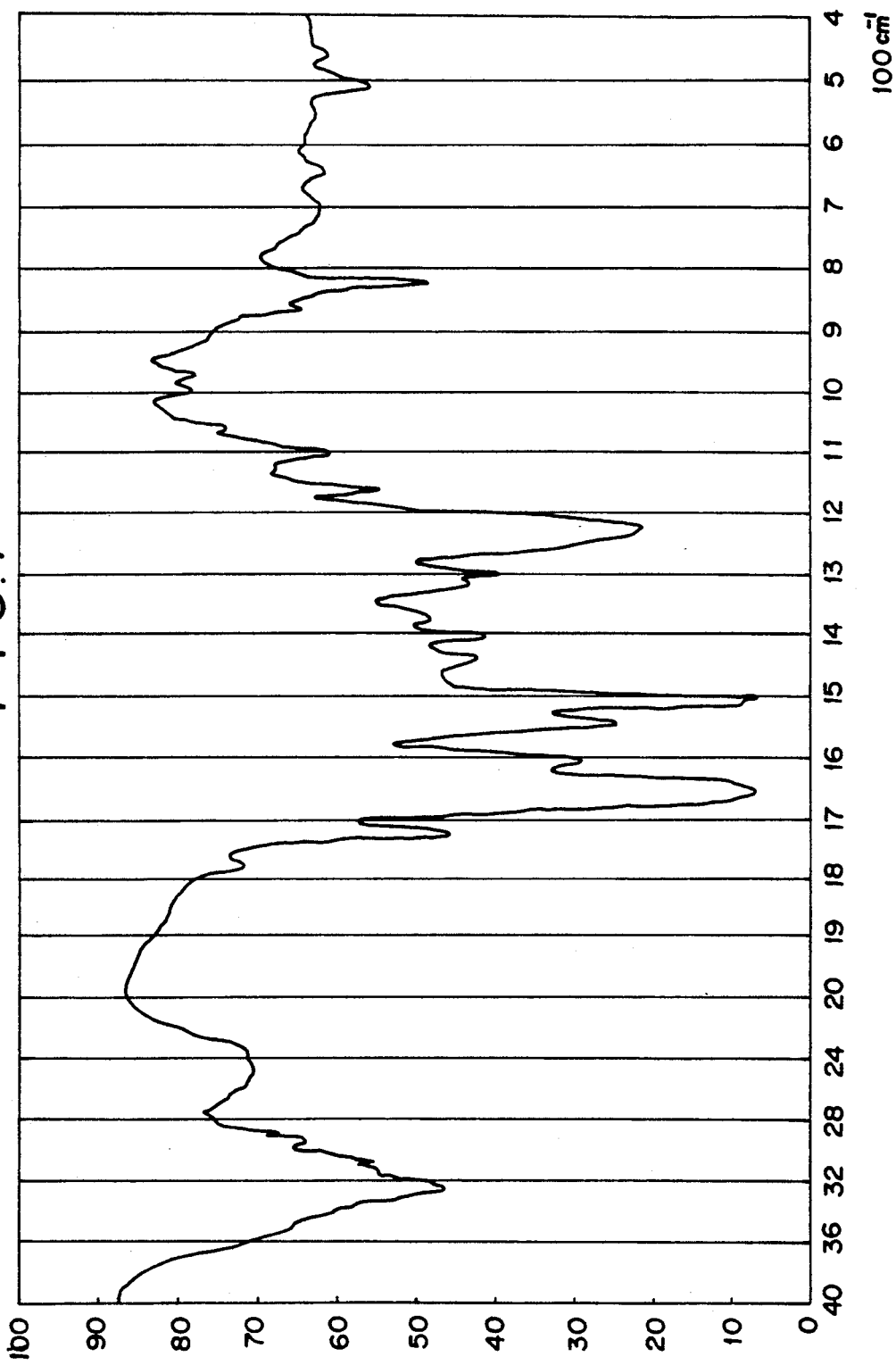
FIG. 1 is an infrared absorption spectrum of a photosensitive polymer of the present invention obtained in Example 1.

A method for preparing a photosensitive polymer of the present invention will be described in detail.

A poly(amide)isoimide can be easily prepared by further reacting, in accordance with a method described on page 631 of Proceedings of Second International Conference on Polyimides (1985), a reaction product of a tetracarboxylic dianhydride, a tricarboxylic anhydride (inclusive of its derivative, and the same shall apply hereinafter) or a reaction product of both of them with a diamine.

The above-mentioned tetracarboxylic dianhydride, tricarboxylic anhydride and diamine can be represented by the formulae (V), (V') and (VI), respectively, and they will be described in detail.

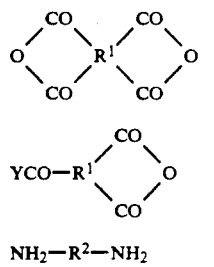

(V)

(V')

$NH_2-R^2-NH_2$ (VI)

(wherein $R^1$ and $R^2$ are as defined above, and Y is OH or Cl).

When $R^1$ is a carbocyclic aromatic group, this group preferably has at least one six-membered ring. In particular, $R^1$ is a monocyclic aromatic group, a condensed polycyclic aromatic group, or a polycyclic aromatic group having several condensed rings or non-condensed rings (these rings are linked with each other directly or via a crosslinking group).

Suitable examples of the above-mentioned crosslinking group are as follows:

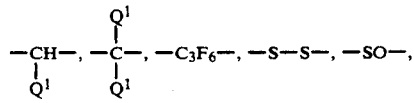

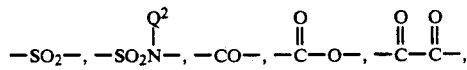

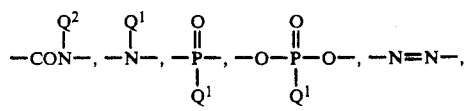

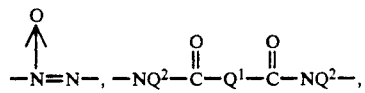

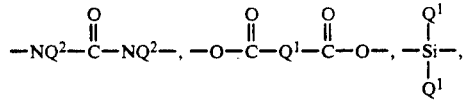

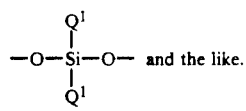 and the like.

In a certain case, $Q^1$ in the above formulae is an alkyl group or an alkylene group having 1 to 6 carbon atoms, preferably 1 to 4 carbon atoms, which may be substituted by one or more of halogen atoms (preferably fluorine atoms), a cycloalkyl group, an aryl group or an allylene group, $Q^2$ is a hydrogen atom, a cycloalkyl group, an aryl group, or in a certain case, an alkyl group having 1 to 4 carbon atoms and substituted by one or more of halogen atoms.

$Q^1$ and $Q^2$ may be linked with each other via two crosslinking groups such as two $-SO_2-$ groups.

In case that $R^1$ is a heterocyclic group, a specific example of such a heterocyclic group is a five-membered or six-membered heterocyclic aromatic group containing oxygen, nitrogen and/or sulfur or a condensed ring of the same and a benzene nucleus.

The carbocyclic aromatic group or the heterocyclic group represented by $R^1$ may be substituted by one or more of, for example, a nitro group, an alkyl group having 1 to 4 carbon atoms, a trifluoromethyl group, a halogen atom (particularly a fluorine atom), a silyl group or a sulfamoyl group.

The group represented by $R^1$ may be either unsubstituted or substituted by, for example, a halogen atom (e.g., fluorine, chlorine or bromine), or one or more alkyl groups or alkoxy group having 1 to 4 carbon atoms.

When $R^2$ is the carbocyclic aromatic group, an example of a preferred group is a monocyclic aromatic group, a condensed polycyclic aromatic group or a non-condensed bicyclic aromatic group. When of this group is a non-condensed bicyclic group, the aromatic rings are linked with each other via a crosslinking group. In this case, the usable crosslinking group is the same as mentioned in the paragraph regarding $R^1$.

When $R^2$ is the heterocyclic group, a particular example is a five-membered or six-membered heterocyclic aromatic group containing O,N and/or S.

When $R^2$ is the aliphatic group, a particular example is an alkylene group having 2 to 12 carbon atoms or another alkylene group in which an alkylene chain contains a hetero-atom, for example, an O, S or N atom.

When $R^2$ is the alicyclic group, an example is a cyclohexyl group or a dicyclohexylmethane group, and when $R^2$ is an aromatic aliphatic group, a particular example is 1,3-, 1,4- or 2,4-bis-alkylenebenzene group, 4,4'-bis-alkylene-diphenyl group, 4,4'-bis-alkylenediphenyl ether group or the like.

It is preferred that each of many $R^1$s present in a polymer is independently a non-substituted monocyclic aromatic group, a non-substituted condensed polycyclic aromatic group or a non-substituted non-condensed bicyclic aromatic group. In the last group, the aromatic rings are linked with each other via a crosslinking group such as —O— or —CO—.

On the other hand, each of $R^2$s is independently, in a certain case, a monocyclic aromatic group or a non-condensed bicyclic aromatic group having one or more of halogen atoms or alkyl groups or alkoxy groups having 1 to 4 carbon atoms as substituents, or it is preferably a non-substituted monocyclic aromatic aliphatic group or a non-substituted aliphatic group having 2 to 10 carbon atoms.

When $R^2$ is a polysiloxane group, this polysiloxane group is represented by the formula (VII)

(VII)

wherein $R^6$ is independently

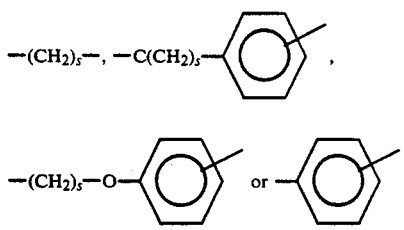

(s is an integer of from 1 to 4), $R^7$ is independently an alkyl group having 1 to 6 carbon atoms, a phenyl group or an alkyl-substituted phenyl group having 7 to 12 carbon atoms, and l is a value of $1 \leq l \leq 100$.

Examples of the tetracarboxylic dianhydride represented by the formula (V) are as follows:
Pyromellitic dianhydride,
3,3',4,4'-benzophenone-tetracarboxylic dianhydride,
2,3,3',4'-benzophenone-tetracarboxylic dianhydride,
2,2',3,3'-benzophenone-tetracarboxylic dianhydride,
3,3',4,4'-diphenyl-tetracarboxylic dianhydride,
2,2',3,3'-diphenyl-tetracarboxylic dianhydride,
bis(2,3-dicarboxyphenyl)-methane dianhydride,
bis(3,4-dicarboxyphenyl)-methane dianhydride,
2,2-bis(2,3-dicarboxyphenyl)-propane dianhydride,
bis(3,4-dicarboxyphenyl) ether dianhydride,
bis(3,4-dicarboxyphenyl)-sulfone dianhydride,
N,N-(3,4-dicarboxyphenyl)-N-methylamine dianhydride,
3,3',4,4'-tetracarboxybenzoyloxy benzene dianhydride,
2,3,6,7-naphthalene-tetracarboxylic dianhydride,
1,2,3,5,6-naphthalene-tetracarboxylic dianhydride,
thiophene-2,3,4,5-tetracarboxylic dianhydride,
pyrazine-2,3,5,6-tetracarboxylic dianhydride,
pyridine-2,3,5,6-tetracarboxylic dianhydride,
2,3,3',4'-biphenyltetracarboxylic dianhydride,
2,2-bis(3,4-dicarboxyphenyl)hexafluoropropane, and the like.

Particularly preferable examples of tricarboxylic anhydride represented by the above-mentioned formula (V') are trimellitic anhydride and trimellitic anhydride chloride.

Examples of the diamines represented by the above-mentioned formula (VI) include known compounds.

Particular examples of the carbocyclic aromatic diamines are as follows:

o-, m- and p-phenylenediamine, diaminotoluenes (e.g., 2,4-diaminotoluene), 1,4-diamino-2-methoxybenzene 2,5-diaminoxylenes, 1,3-diamino-4-chlorobenzene, 1,4-diamino-2,5-dichlorobenzene, 1,4-diamino-2-bromobenzene, 1,3-diamino-4-isopropylbenzene, 4,4'-diaminodiphenyl-2,2-propane, 4,4'-diaminodiphenylmethane, 2,2'-diaminostilbene, 4,4'-diaminostilbene, 4,4'-diaminodiphenyl ether, 4,4'-diaminodiphenyl thioether, 4,4'-diaminodiphenylsulfone, 3,3'-diaminodiphenylsulfone, phenyl 4,4'-diaminobenzoate, 2,2'-diaminobenzophenone, 4,4-diaminobenzophenone, 4,4'-diaminobenzyl, 4-(4'-aminophenylcarbamoyl)-aniline, bis(4-aminophenyl)-phosphine oxide, bis(4-aminophenyl)-methyl-phosphine oxide, bis(3-aminophenyl)-methylsulfine oxide, bis(4-aminophenyl)-phenylphosphine oxide, bis(4-aminophenyl)-cyclohexylphosphine oxide, N,N-bis(4-aminophenyl)-N-phenylamine, N,N-bis(4-aminophenyl)-N-methylamine, 4,4'-diaminodiphenylurea, 1,8-diaminonaphthalene, 1,5-diaminonaphthalene, 1,5-diaminoanthraquinone, diaminofluoranthene, bis(4-aminophenyl)-diethylsilane, bis(4-aminophenyl)-dimethylsilane, bis(4-aminophenyl)-tetramethyldisiloxane, 3,4'-diaminodiphenyl ether, benzidine, 2,2'-dimethylbenzidine, 2,2-bis[4-(4-aminophenoxy)phenyl]propane, bis[4-(4-aminophenoxy)phenyl]sulfone, 4,4'-bis(4-aminophenoxy)biphenyl, 2,2-bis[4-(4-aminophenoxy)phenyl]hexafluoropropane, 1,4-bis(4-aminophenoxy)benzene, 1,3-bis(4-aminophenoxy)benzene and the like.

Examples of the heterocyclic diamines are as follows:
2,6-diaminopyridine, 2,4-diaminopyridine, 2,4-diamino-s-triazine, 2,7-diamino-dibenzofuran, 2,7-diaminocarbazole, 3,7-diaminophenothiazine, 2,5-diamino-1,3,4-thiaziazole, 2,4-diamino-6-phenyl-s-triazine and the like.

Furthermore, examples of the aliphatic diamine are as follows:

Dimethylenediamine, trimethylenediamine, tetramethylenediamine, hexamethylenediamine, heptamethylenediamine, octamethylenediamine, nonamethylenediamine, decamethylenediamine, 2,2-dimethylpropylenediamine, 2,5-dimethylhexamethylenediamine, 2,5-dimethylheptamethylenediamine, 4,4-dimethylheptanethylenediamine, 3-methylheptamethylenediamine, 3-methoxyheptamethylenediamine, 5-methylnonamethylenediamine, 2,11-diaminododecane, 1,12-diaminooctadecane, 1,2-bis(3-aminopropoxy)ethane, diamines represented by the formula H₂N(CH₂)₃O(CH₂)₂O(CH₂)₃NH₂ and the like.

Furthermore, suitable exemplary compounds of the alicyclic diamine include 1,4-diaminocyclohexane, 4,4'-diamino-dicyclohexylmethane and the like. Suitable examples of the aromatic-aliphatic diamine include 1,4-bis(2-methyl-4-aminopentyl)-benzene, 1,4-bis(1,1-dimethyl-5-aminopentyl)-benzene, 1,3-bis(aminomethyl)-benzene, 1,4-bis(aminomethyl)-benzene and the like.

Moreover, exemplary compounds of the diaminopoly siloxane are as follows:

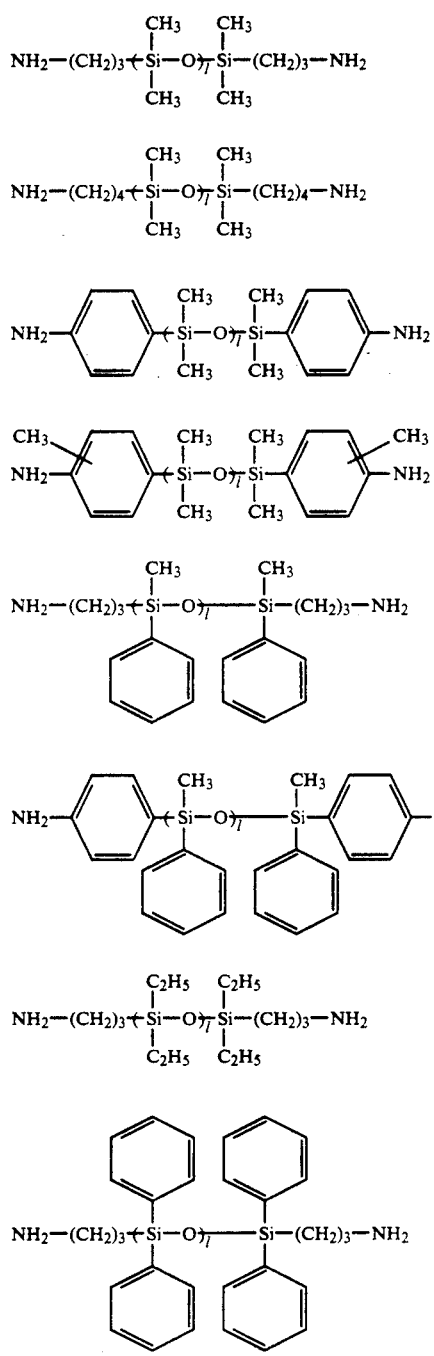

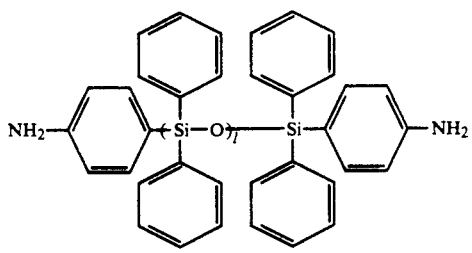

and the like.

Next, the hydroxyphenyl group-containing amine represented by the formula (IV) will be described.

In the formula (IV), $R^3$ preferably is a divalent organic group having 1 to 10 carbon atoms, i.e., a residue such as an aliphatic group, an alicyclic group, an aromatic group or an aromatic aliphatic group. However, this kind of group may contain a polar group such as a hydroxyl group, a carboxyl group, an ether, an ester, a ketone or the like. $R^4$ is preferably

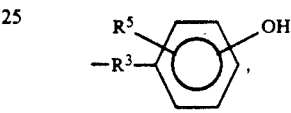

a hydrogen atom or an organic group having 1 to 10 carbon atoms such as an aliphatic group, an alicyclic group, an aromatic group or an aromatic aliphatic group. However, this kind of group may contain a polar group such as a hydroxyl group, a carboxyl group, an ether, an ester, a ketone or the like. $R^5$ preferably is a hydrogen atom or an organic group having 1 to 10 carbon atoms such as an aliphatic group or an alkoxy group. However, this kind of group may contain a polar group such as a hydroxyl group, a carboxyl group, an ether, an ester, a ketone or the like.

Examples of the compound represented by the formula (IV) include the following compounds:

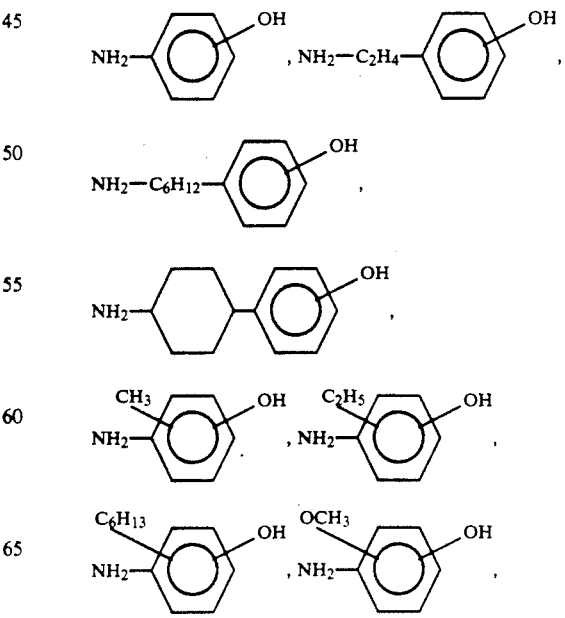

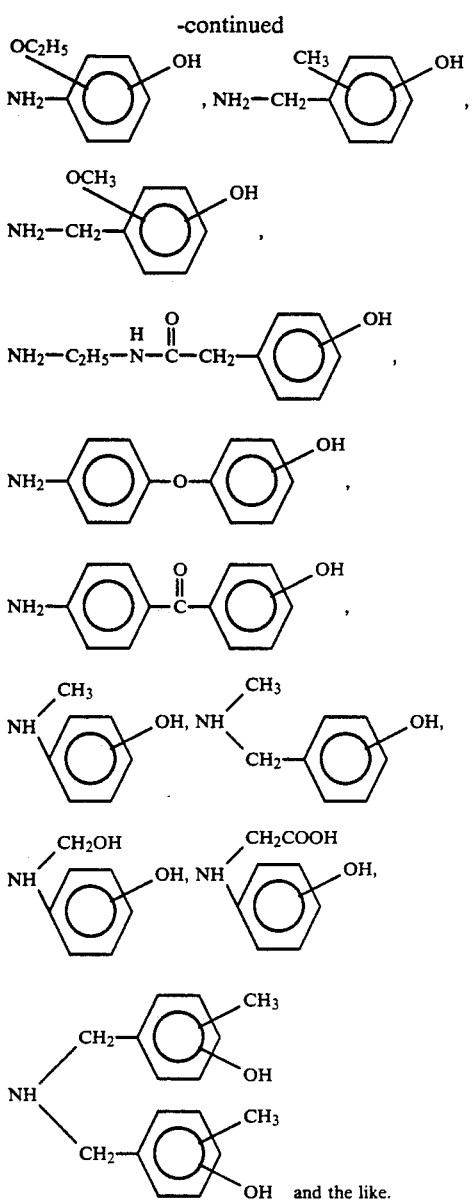

and the like.

Preferable solvents which can be used in preparing the photosensitive polymer of the present invention (hereinafter referred to as simply "reaction solvent" at times) are as follows:

N-methyl-2-pyrrolidone, N,N-dimethylacetamide, N,N-dimethylformamide, dimethyl sulfoxide, tetramethylurea, pyridine, dimethylsulfone, hexamethylphosphoramide, methylformamide, N-acetyl-2-pyrrolidone, ethylene glycol monomethyl ether, ethylene glycol monoethyl ether, ethylene glycol monobutyl ether, diethylene glycol monomethyl ether, diethylene glycol dimethyl ether, cyclopentanone, cyclohexanone, cresol, γ-butyrolactone, N,N-diethylacetamide, N,N-diethylformamide, N,N-dimethylmethoxyacetamide, tetrahydrofuran, N-methyl- -caprolactam, tetrahydrothiophene dioxide (sulpholane) and the like.

Furthermore, this reaction can be carried out in a mixed solvent which can be obtained mixing the above-mentioned organic solvents. The above-mentioned preferable organic solvent, when used, can be diluted with another aprotic (neutral) organic solvent such as an aromatic, an alicyclic or an aliphatic hydrocarbon or its chlorinated derivative (e.g., benzene, toluene, xylene, cyclohexane, pentane, hexane, petroleum ether or methylene chloride), or it can be diluted with dioxane.

In the presence of the above-mentioned solvent, the poly(amide)amic acid can be synthesized from the above-mentioned acid anhydride and diamine by a known process.

In this case, for the purpose of improving the adhesion to a substrate, an aminosilane represented by the following formula (VIII) can be introduced to the terminal of the polymer.

$$NH_2-R^8-SiR^9{}_{3-k}X_k \qquad (VIII)$$

wherein $R^8$ is

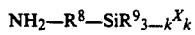
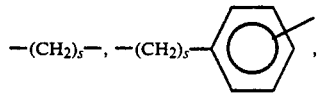

(s is an integer of from 1 to 4), $R^9$ is independently an alkyl group or a phenyl group having 1 to 6 carbon atoms or an alkyl-substituted phenyl group having 7 to 12 carbon atoms, X is independently a hydrolyzable alkoxy group, an acetoxy group or a halogen, and k is a value of $1 \leq k \leq 3$].

Next, examples of the aminosilane represented by the formula (VIII) are as follows:

Aminomethyl-di-n-propoxymethylsilane, (β-aminoethyl)-di-n-propoxymethylsilane, (β-aminoethyl)-diethoxyphenylsilane, (β-aminoethyl)-tri-n-propoxysilane, (β-aminoethyl)-dimethoxymethylsilane, (γ-aminopropyl)-di-n-propoxymethylsilane, (γ-aminopropyl)-di-n-butoxymethylsilane, (γ-aminopropyl)-trimethoxysilane, (γ-aminopropyl)-triethoxysilane, (γ-aminopropyl)-di-n-pentoxyphenylsilane, (γ-aminopropyl)methoxy-n-propoxymethylsilane, (δ-aminobutyl)-dimethoxymethylsilane, (3-aminophenyl)-di-n-propoxymethylsilane, (4-aminophenyl)-tri-n-propoxysilane, [β-(4-aminophenyl)-ethyl]-diethoxymethylsilane, [β-(3-aminophenyl)-ethyl]-di-n-propoxyphenylsilane, [γ-(4-aminophenyl)-propyl]-di-n-propoxymethylsilane, [γ-(4-aminophenoxy)-propyl]-di-n-propoxymethylsilane, [γ-(3-aminophenoxy)-propyl]-di-n-butoxymethylsilane, (γ-aminopropyl)-methyl-dimethoxysilane, (γ-aminopropyl)-methyl-diethoxysilane, (γ-aminopropyl)-ethyl-di-n-propoxysilane, 4-aminophenyl-trimethoxysilane, 3-aminophenyl-trimethoxysilane, 4-aminophenyl-methyl-dimethoxysilane, 3-aminophenyl-di-methyl-methoxysilane, 4-aminophenyl-tri-ethoxysilane and the like.

In addition to these compounds, a monofunctional acid anhydride or amine can be added to the reaction system for the purpose of controlling the molecular weight of the poly(amide)amic acid. Examples of this kind of monofunctional compound are as follows:

Phthalic anhydride, maleic anhydride, aniline, monoallylamine and the like.

The thus synthesized polyamic acid can be easily converted into a polyisoimide with the aid of, for example, a dehydrating agent such as N,N'-dicyclohexylcarbodiimide, trifluoroacetic anhydride or the like in accordance with the above-mentioned Proceedings of the Second International Conference on Polyimides. In this case, an imido group is formed at times, depending upon reaction conditions.

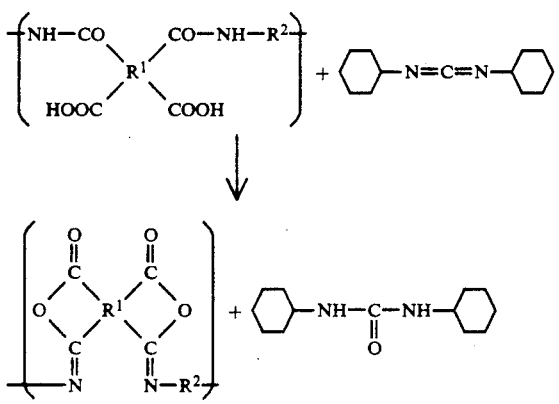

Although the exemplary reaction with the polyamic acid by the use of the dehydrating agent of N,N'-dicyclohexylcarbodiimide is elucidated above, it is not always necessary that all of the amic acid is converted into the isoimide. However, when the ratio of the isoimide in the polymer decreases, the ratio of the hydroxyphenyl group-containing amine to be added also decreases, so that sensitivity deteriorates. For this reason, it is preferred that the conversion into the isoimide is achieved as much as possible.

Next, the amine represented by the formula (IV) is added to this poly(amide)isoimide, and the reaction is then carried out in the presence of a reaction solvent. The amount of the amine to be added to the isoimide may be more or less than the equimolar amount, but it is preferably in the vicinity of the equimolar amount. A reaction temperature is in the range of from 0° to 100° C., preferably from about 10° to about 30° C. A reaction time is preferably in the range of from 0.2 to 30 hours, more preferably from about 1 to about 10 hours.

In this way, the photosensitive polymer of the present invention represented by the formula (I) can be obtained. The logarithmic viscosity number of this polymer is preferably in the range of from 0.1 to 5 dl/g from the viewpoint of film-forming properties. Here, the logarithmic viscosity number is $\eta_{inh}$ which can be defined by the formula $$\eta_{inh} = \frac{\ln \eta/\eta_o}{C}$$

(wherein $\eta$ is a value measured in a solvent at a temperature of 30°±0.01° C. at a concentration of 0.5 g/dl by the use of a Ubbelohde's viscometer, $\eta_o$ is a value of the same solvent at the same temperature by the use of the same viscometer, and C is a concentration of 0.5 g/dl). As the solvent for determining the $\eta_{inh}$, there can be used the reaction solvent.

The photosensitive polymer of the present invention can be stored intactly in the state of a solution. However, this solution may be added to a large amount of a non-solvent and the precipitated polymer is collected by filtration and then dried to obtain a powdery or massy solid, and the polymer can be stored in the form of such a solid.

The photosensitive polymer composition of the present invention can be composed of the above-mentioned (a), (b), (c) and (d) and a solvent.

The photosensitive polymer described in the paragraph (a) contains the repeating unit represented by the formula (I), but it is not always necessary that this kind of repeating unit is present in a concentration of 100%. However, in practice, it is preferred that the above-mentioned repeating unit is present in a concentration of 30 mol % or more of all the repeating units. As repeating units other than the repeating unit represented by the formula (I), any one can be used without restriction, but the following repeating units are practically used singly or in combination.

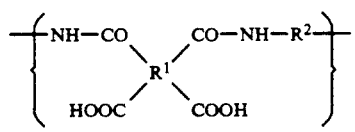

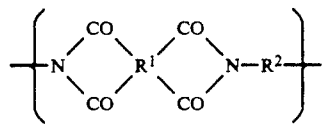

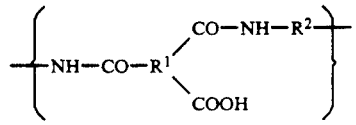

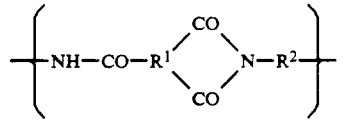

The concentration of the photosensitive polymer in the photosensitive polymer composition is from 2 to 50% by weight, preferably from 10 to 30% by weight.

Examples of the photopolymerization initiator or the sensitizer described in the paragraph (b) include the following compounds, and they can be used singly or in combination.

Benzoin, benzoin ether, benzophenone, p,p'-dimethylbenzophenone, 4,4'-bis(diethylaminobenzophenone), Michler's ketone, 2-nitrofluorene, 5-nitroacenaphthene, 4-nitro-1-naphthylamine, anthrone, 1,9-benzanthrone, dibenzalacetone, anthraquinone, 2-methylanthraquinone, 1-nitropyrene, 1,8-dinitropyrene, pyrene-1,6-quinone, cyanoacridine, benzoquinone, 1,2-naphthoquinone, 1,4-naphthoquinone, 1,2-benzanthraquinone and the like.

The amount of the photopolymerization initiator or the sensitizer to be used is in the range of from 0 to 20% by weight, preferably from 0 to 10% by weight based on the weight of the photosensitive polymer.

Examples of the azide compound described in tile above-mentioned paragraph (c) include the following compounds, and they can be used singly or in combination.

2,6-di(p-azidobenzal)-4-methylcyclohexanone, 2,6-di(p-azidobenzal)cyclohexanone, 4,4'-diazidochalcone, 4,4'-diazidobenzalacetone, 4,4'-diazidostilbene, 4,4'- diazidobenzophenone, 4,4′-diazidodiphenylmethane, 4,4′-diazidophenylamine and the like.

The amount of the azide compound to be added is in the range of from 0.1 to 50% by weight, preferably from 1 to 20% by weight based on the weight of the photosensitive polymer.

Examples of the compound having the carbon-carbon double bond described in the above-mentioned paragraph (d) include the following compounds, and they can be used singly or in combination.

Butyl acrylate, cyclohexyl acrylate, dimethylaminoethyl methacrylate, benzyl acrylate, carbitol acrylate, 2-ethylhexyl acrylate, 2-ethylhexyl methacrylate, lauryl methacrylate, 2-hydroxyethyl acrylate, 2-hydroxyethyl methacrylate, 2-hydroxypropyl acrylate, 2-hydroxypropyl methacrylate, glycidyl methacrylate, N-methylolacrylamide, N-diacetoneacrylamide, N,N′-methylenebisacrylamide, N-vinylpyrrolidone, ethylene glycol diacrylate, diethyleneglycol diacrylate, triethylene glycol diacrylate, butylene glycol diacrylate, butylene glycol dimethacrylate, neopentyl glycol diacrylate, neopentyl glycol dimethacrylate, 1,4-butanediol diacrylate, 1,6-hexanediol diacrylate, 1,6-hexanediol dimethacrylate, pentaerythritol diacrylate, pentaerythritol triacrylate, trimethylolpropane triacrylate, trimethylol propanetrimethacrylate and the like.

The amount of the compound having the carbon-carbon double bond to be used is in the range of from 0 to 10% by weight, preferably from 0 to 5% by weight based on the weight of the photosensitive polymer.

In addition, a crosslinking auxiliary can be used in an amount of 10% by weight or less based on the weight of the photosensitive polymer, and examples of the crosslinking auxiliary include known polyvalent thiols such as pentaerythritol tetra(3-mercaptopropionate), pentaerythritol tetra(mercapto acetate) or the like. Moreover, a secondary material such as a dye or a pigment can also be used.

The photosensitive polymer composition can be obtained by dissolving the compounds described in the paragraphs (a), (b), (c) and (d) in the above-mentioned reaction solvent.

Next, the method for forming the patterned poly(amide)imide film by the use of the polymer composition of the present invention will be described. The polymer composition of the present invention can be applied on a substrate such as a silicone wafer, a metal plate, a plastic plate or a glass plate in a known manner such as spin coat, dipping or spray printing. The coating film is prebaked at a temperature of from 30° to 150° C. for a period of several minutes to several tens of minutes by a heating means such as an electric furnace or a hot plate to remove most of the solvent present in the coating film therefrom. This coating film is then irradiated with an actinic radiation through a negative mask. Examples of the actinic radiation include X-rays, electron beams, ultraviolet rays, far ultraviolet rays and visible rays, but above all, the ultraviolet rays and the far ultraviolet rays are particularly suitable. Next, the unexposed portions on the coating film are dissolved and removed with a developing solution to obtain a relief pattern. The developing solution can be selected from the above-mentioned reaction solvents but can also be used in the form of a mixed solution of the same and a lower alcohol such as methanol, ethanol or propanol.

The relief pattern, if necessary, is rinsed in the above-mentioned non-solvent, and it is then dried at a temperature of 150° C. or less with the intention of stabilizing the relief pattern. After the prebaking, the film is peeled from the substrate at a suitable point of time, and it can also be used as a single film. The relief pattern polymer which has been prepared through the development has the form of a precursor, and therefore this polymer is then heated at a temperature of from 200° to 500° C., preferably 300° to 400° C. for a period of several tens of minutes to several hours by the above-mentioned heating means, whereby the patterned poly(amide)imide film is formed. In this case, the chemical reaction proceeds as follows. The photosensitive component is volatilized by the thermal decomposition to form a poly(amide)imide.

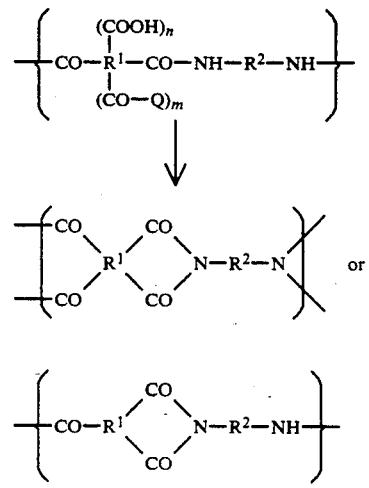

(wherein Q is a crosslinked photosensitive component).

As described above, the patterned heat resistant poly(amide)imide film can be obtained from the photosensitive polymer of the present invention.

The photosensitive polymer of the present invention can be applied to electronic materials, particularly passivation films for semiconductors, printed circuits and the like.

As discussed above, the novel photosensitive polymer of the present invention can be prepared easily by the preparation method of the present invention, and the photosensitive polymer composition which is a solution obtained by adding suitable amounts of specific additives to a specific solvent and dissolving them therein has a practically sufficient sensitivity and permits forming a good pattern. In addition, the photosensitive polymer composition of the present invention is excellent in shelf stability, so that the change of a film thickness with time is little.

EXAMPLES

The present invention will be described in more detail in reference to examples, but these examples do not intend to limit the present invention.

EXAMPLE 1

A 1-liter flask equipped with a stirrer, a dropping funnel, a thermometer, a condenser and a nitrogen replacer was fixed in a thermostatic chamber. 500 g of dehydrated and purified N-methyl-2-pyrrolidone (hereinafter referred to simply as "NMP"), 25.49 g (0.127 mol) of 4,4′-diaminophenyl ether (hereinafter referred to simply as "DDE") and 1.04 g (0.0182 mol) of allylamine were then placed in the flask, and stirring was continued to dissolve them. Furthermore, 21.97 g (0.0682 mol) of 3,3',4,4'-benzophenonetetracarboxylic dianhydride (hereinafter referred to simply as "BTDA") and 14.87 g (0.0682 mol) of pyromellitic dianhydride (hereinafter referred to simply as "PMDA") were added, and reaction was then carried out at 20°-30° C. for 8 hours, thereby obtaining a polyamic acid in which allylamine was added to a terminal. Afterward, 56.28 g (0.273 mol) of N,N'-dicyclohexylcarbodiimide (hereinafter referred to simply as "DCC") was added, and the reaction was further carried out at this temperature for 10 hours, so that the white precipitate of N,N'-dicyclohexylurea was deposited and a polyisoimide solution was obtained. 29.77 g (0.273 mol) of p-aminophenol was added to this solution, and the reaction was carried out at 20°-30° C. for 5 hours. This solution was filtered to remove the white precipitate of N,N'-dicyclohexylurea, and then added dropwise to a large amount of ethanol to precipitate the photosensitive polymer of the present invention. This polymer was collected by filtration and then dried overnight under reduced pressure at 50° C. to isolate this polymer.

The logarithmic viscosity number of the thus obtained polymer of the present invention in NMP was 1.13 dl/g. The infrared absorption spectrum of the polymer is shown in FIG. 1.

EXAMPLE 2

In the same device as in Example 1, 40.40 g (0.0934 mol) of bis[4-(4-aminophenoxy)phenyl]sulfone and 2.56 g (0.0120 mol) of p-aminophenyltrimethoxysilane were poured into 500 g of N,N-dimethylacetamide (hereinafter referred to simply as "DMAc"), and stirring was continued for dissolution. Next, 16.12 g (0.0500 mol) of BTDA and 10.91 g (0.0500 mol) of PMDA were added to this solution, and reaction was carried out at 20°-30° C. for 8 hours, thereby obtaining a polyamic acid in which p-aminophenyltrimethoxysilane was added to a terminal. Afterward, 41.30 g (0.200 mol) of DCC was added to this solution, and the reaction was further carried out at this temperature for 10 hours, so that the white precipitate of N,N'-dicyclohexylurea was deposited and a polyisoimide solution was obtained. 21.84 g (0.200 mol) of p-aminophenol was added to this solution, and the reaction was carried out at 20°-30° C. for 5 hours. This solution was filtered to remove the white precipitate of N,N'-dicyclohexylurea therefrom, and then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus obtained polymer in NMP was 1.53 dl/g.

EXAMPLE 3

In the same device as in Example 1, 36.46 g (0.177 mol) of DDE was poured into 500 g of DMAc, and stirring was continued for dissolution. Next, 34.77 g (0.159 mol) of PMDA and 3.47 g (0.0354 mol) of maleic anhydride were added to this solution, and reaction was carried out at 20°-30° C. for 6 hours, thereby obtaining a polyamic acid in which maleic anhydride was added to a terminal. Afterward, 32.89 g (0.159 mol) of DCC was added to this solution, and the reaction was further carried out at this temperature for 10 hours, so that the white precipitate of N,N'-dicyclohexylurea was deposited and a polyisoimide solution was obtained. 17.40 g (0.159 mol) of p-aminophenol was added to this solution, and the reaction was carried out at 20°-30° C. for 5 hours. This solution was filtered to remove the white precipitate of N,N'-dicyclohexylurea therefrom, and then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus-obtained polymer of the present invention in NMP was 0.58 dl/g.

EXAMPLE 4

In the same device as in Example 1, 38.39 g (0.131 mol) of 1,4-bis(4-aminophenoxy)benzene was poured into 500 g of NMP, and stirring was continued for dissolution. Next, 30.16 g (0.138 mol) of PMDA was added to this solution, and reaction was carried out at 20°-30° C. for 5 hours. Furthermore, 0.79 g (0.0138 mol) of allylamine was added and the reaction was further carried out for 5 hours, thereby obtaining a polyamic acid in which allylamine was added to a terminal. Afterward, 42.79 g (0.207 mol) of DCC was added to this solution, and the reaction was additionally carried out at this temperature for 10 hours, so that the white precipitate of N,N'-dicyclohexylurea was deposited and a polyisoimide solution was obtained. 22.63 g (0.207 mol) of p-aminophenol was added to this solution, and the reaction was carried out at 20°-30° C. for 6 hours. This solution was filtered to remove the white precipitate of N,N'-dicyclohexylurea therefrom, and then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus obtained polymer in NMP was 1.32 dl/g.

EXAMPLE 5

In the same device as in Example 1, 36.54 g (0.182 mol) of DDE was poured into 500 g of NMP, and stirring was continued for dissolution. Next, 35.02 g (0.182 mol) of trimellitic anhydride was added to this solution, and reaction was carried out at 20°-30° C. for 5 hours. Furthermore, 75.31 g (0.365 mol) of DCC was added to the solution and the reaction was carried out for 40 hours, so that the conversion of amic acid into isoimide and the condensation of a terminal amino group and a carboxyl group were achieved simultaneously, thereby obtaining a polyamide-isoamide solution. Afterward, 19.92 g (0.182 mol) of p-aminophenol was added to this solution, and the reaction was further carried out at 20°-30° C. for 8 hours. This solution was filtered to remove the white precipitate of N,N'-dicyclohexylurea therefrom, and then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus obtained polymer in NMP was 0.33 dl/g.

EXAMPLE 6

In the same device as in Example 1, 31.76 g (0.0774 mol) of 2,2-bis[4-(4-aminophenoxy)phenyl]propane was poured into 500 g of DMAc, and stirring was continued for dissolution. Next, 34.62 g (0.0967 mol) of diphenylsulfone-3,3',4,4'-tetracarboxylic dianhydride was added to this solution, and reaction was carried out at 20°–30° C. for 5 hours. Furthermore, 4.22 g (0.0387 mol) of p-aminophenol was added to the solution and the reaction was further carried out for 5 hours, thereby obtaining a polyamic acid in which p-aminophenol was added to a terminal. Afterward, 39.91 g (0.193 mol) of DCC was added to this solution, and the reaction was further carried out at 20°–30° C. for 10 hours to deposit the white precipitate of N,N'-dicyclohexylurea. This solution was filtered to remove this white precipitate therefrom, and then added dropwise to a large amount of acetone to precipitate a polyisoimide. This polymer was collected by filtration and then dried overnight under reduced pressure at 50° C. to isolate this polymer. Afterward, 15.00 g of the thus obtained polyisoimide and 100 g of dehydrated and purified DMAC were placed in a 200-ml flask equipped with a stirrer, a dropping funnel, a thermometer, a condenser and a nitrogen replacer fixed in a thermostatic chamber, and stirring was continued to dissolve the polyisoimide therein. 3.59 g (0.0329 mol) of p-aminophenol was added to this solution, and the reaction was carried out at 20°–30° C. for 5 hours. The solution was then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus obtained polymer in NMP was 0.42 dl/g.

EXAMPLE 7

In the same device as in Example 1, 21.46 g (0.0496 mol) of bis[4-(4-aminophenoxy)phenyl]sulfone, 12.32 g (0.0496 mol) of 1,3-bis(3-aminopropyl)-1,1,3,3-tetramethyldisiloxane and 0.81 g (0.0142 mol) of allylamine were poured into 500 g of DMAC, and stirring was continued for dissolution. Next, 34.26 g (0.106 mol) of BTDA was added to this solution, and reaction was carried out at 20°–30° C. for 8 hours, thereby obtaining a polyamic acid in which allylamine was added to a terminal. Afterward, 43.87 g (0.213 mol) of DCC was added to this solution, and the reaction was further carried out at this temperature for 8 hours to deposit the white precipitate of N,N'-dicyclohexylurea. This white precipitate was removed by filtration, and the resultant filtrate was then added dropwise to a large amount of acetone to precipitate a polyisoimide. This polymer was collected by filtration and then dried overnight under reduced pressure at 50° C. to isolate this polyisoimide.

Afterward, 15.00 g of the thus obtained polyisoimide and 100 g of dehydrated and purified DMAC were placed in a 200-ml flask equipped with a stirrer, a dropping funnel, a thermometer, a condenser and a nitrogen replacer fixed in a thermostatic chamber, and stirring was continued to dissolve the polyisoimide therein. 3.94 g (0.0361 mol) of p-aminophenol was added to this solution, and the reaction was carried out at 20°–30° C. for 6 hours. The solution was then added dropwise to a large amount of ethanol to precipitate the photosensitive polymer of the present invention. This polymer was collected by filtration and then dried overnight under reduced pressure at 50° C. to isolate this polymer. The logarithmic viscosity number of the thus obtained polymer in NMP was 1.46 dl/g.

EXAMPLE 8

4.5 g of each of the photosensitive polymers of the present invention which had been synthesized in Examples 1 to 7 was dissolved in 25.5 g of NMP, and a azide compound, if necessary a photopolymerization initiator or a sensitizer and a compound having a carbon-carbon double bond and the like were suitably added to the resultant solution, thereby preparing the photosensitive polymer compositions of the present invention.

Figure 2:
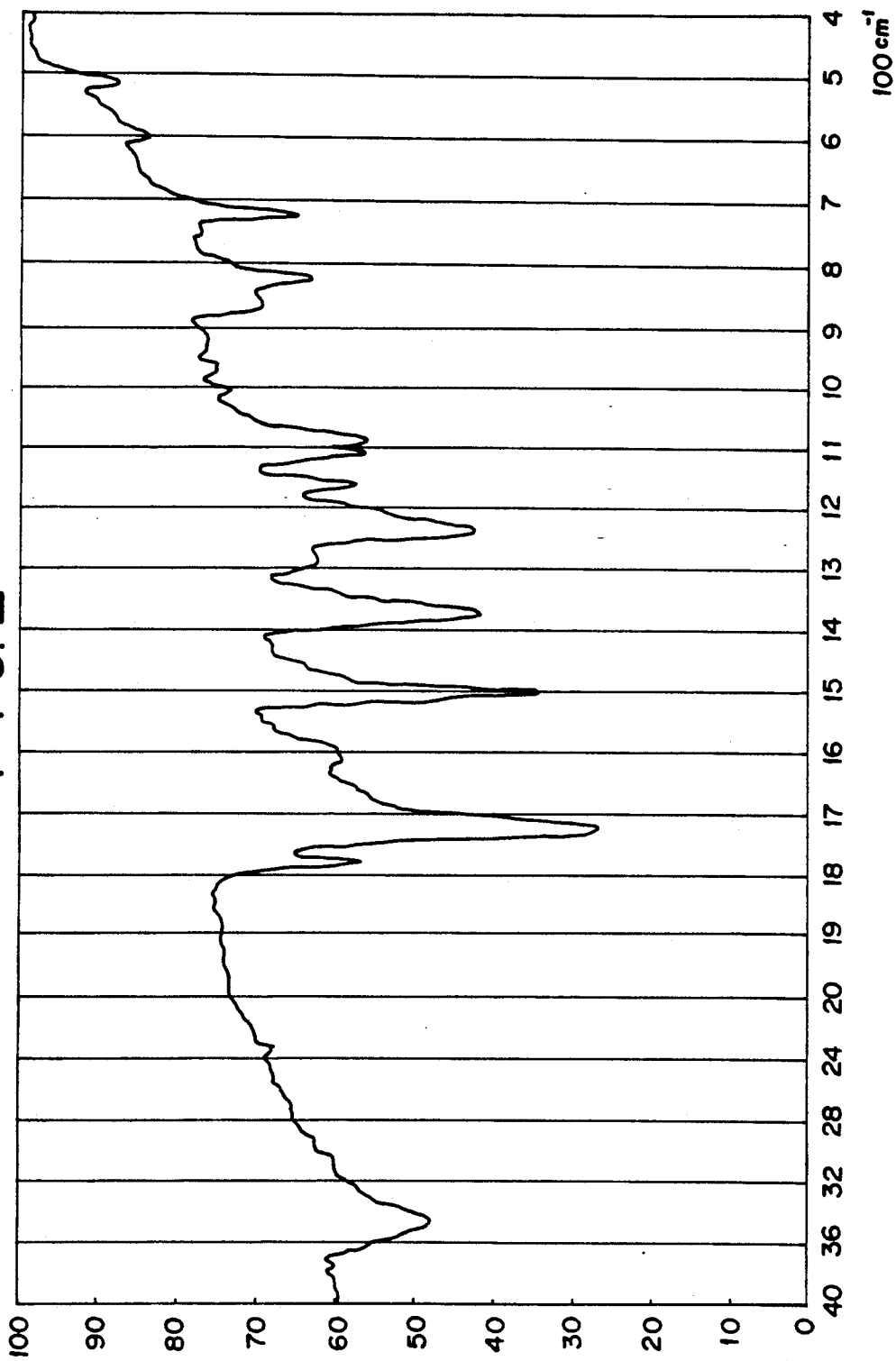
FIG. 2 is an infrared absorption spectrum of a polymer (after calcination) of Example 8-1.

A silicone wafer was spin-coated with each composition, and the latter was then prebaked at 70° C. for 40 minutes to form a uniform film thereon. Next, this film was exposed to the light from an ultra-high pressure mercury vapor lamp (20 mW/cm$^2$) for various irradiation times, and then immersed in a mixed solution of 4 parts by volume of NMP and 1 part by volume of ethyl alcohol to develop the film. This developed film was rinsed in ethyl alcohol and then dried, whereby a fresh relief pattern was obtained. Each exposure necessary to give 0.5 in terms of a value obtained by normalizing the thickness of the developed film by that of the undeveloped film is set forth in Table 1 as sensitivity. Each relief pattern was calcined at 200° C. for 30 minutes and additionally at 400° C. for 30 minutes in an electric furnace, and as a result, the pattern did not crumble. According to the infrared absorption spectra of the polymers, it was confirmed that every photosensitive polymer, after the calcination, was converted into the poly(amide)imide. The infrared absorption spectrum of the polymer in Example 8-11 (after the calcination) is shown in FIG. 2.

Furthermore, in order to inspect the stability of these photosensitive polymers with time, the rotational viscosities* of the respective photosensitive polymer compositions were measured immediately after the preparation of these compositions and after they were allowed to stand at room temperature for 1 month. The photosensitive compositions of the examples and the detailed values of the measured results are set forth in Table 1.

*The rotational viscosity was a viscosity measured at a temperature of 25° C. by the use of an E type viscometer (trade name VISCONIC EMD made by Tokyo Keiki Co., Ltd.).

COMPARATIVE SYNTHESIS EXAMPLE 1

The same device and the same procedure as in Example 1 were utilized, and a polyamic acid solution having a logarithmic viscosity number of 1.1 dl/g was synthesized from 100 g of NMP, 12.34 g (0.0383 mol) of BTDA and 7.66 g (0.0383 mol) of DDE. Afterward, 14.19,g (0.0766 mol) of dimethylaminoethyl methacrylate was mixed with this solution to obtain a photosensitive polymer solution. 30 g of this solution was sampled, and an additive shown in Table 1 was added thereto. Next, in the same manner as in the above-mentioned examples, a photosensitive test and the stability of the photosensitive polymers with time were measured. The results are shown in Table 1.

TABLE 1

| Example or Comp. Example | Photosensitive Polymer | Diazido Compound | Polymerization Initiator or Sensitizer | Compound with Carbon-carbon Double Bond | Sensitivity (thickness of coating film) | Rotational Viscosity (cps) (after 1 month / just after preparation) |
|---|---|---|---|---|---|---|
| Example 8-1 | Example 1 | A-1*[1] 0.45 g | 2-nitrofluorene 0.18 g | — | 45 mJ/cm$^2$ (4.5μ) | 1540 / 1560 |

TABLE 1-continued

| Example or Comp. Example | Photosensitive Polymer | Diazido Compound | Polymerization Initiator or Sensitizer | Compound with Carbon-carbon Double Bond | Sensitivity (thickness of coating film) | Rotational Viscosity (cps) (after 1 month / just after preparation) |
|---|---|---|---|---|---|---|
| Example 8-2 | Example 2 | A-1 0.45 g | 2-nitrofluorene 0.18 g | — | 40 mJ/cm$^2$ (4.9μ) | 2170/2200 |
| Example 8-3 | Example 3 | A-1 0.45 g | 1-nitropyrene 0.23 g | M-1*[3]) 0.23 g | 185 mJ/cm$^2$ (3.7μ) | 470/590 |
| Example 8-4 | Example 4 | A-1 0.45 g | 5-nitroacenaphthene 0.23 g | M-2*[4]) 0.23 g | 95 mJ/cm$^2$ (4.7μ) | 1700/1820 |
| Example 8-5 | Example 5 | A-1 0.45 g | benzanthrone 0.23 g | — | 105 mJ/cm$^2$ (2.5μ) | 195/210 |
| Example 8-6 | Example 6 | A-2*[2]) 0.23 g | — | — | 90 mJ/cm$^2$ (3.0μ) | 360/380 |
| Example 8-7 | Example 7 | A-2 0.23 g | Michler's ketone 0.45 g | — | 60 mJ/cm$^2$ (4.8μ) | 1890/1950 |
| Comparative Example 1 | Comparative Example 1 | — | Michler's ketone 0.45 g | — | 4600 mJ/cm$^2$ (4.2μ) | 420/1200 |

*[1])A-1: 2,6-di(p-azidobenzal)-4-methylcyclohexanone
*[2])A-2: 2,6-di(p-azidobenzal)cyclohexanone
*[3])M-1: Trimethylolpropane trimethacrylate
*[4])M-2: Pentaerythritol triacrylate

What we claim is:

1. A photosensitive polymer composition comprising the following components (a), (b), (c) and (d) and a solvent:

(a) a photosensitive polymer comprising a repeating unit represented by the following formula (I) and having a logarithmic viscosity number of from 0.1 to 5 dl/g as measured in a solvent at a temperature of 30°±0.01° C. at a concentration of 0.5 g/dl:

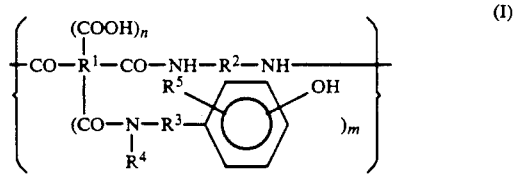

wherein $R^1$ is a trivalent or tetravalent carbocyclic aromatic group or heterocyclic group, $R^2$ is an aliphatic group having at least two carbon atoms, an alicyclic group, an aromatic aliphatic group, a carbocyclic aromatic group, a heterocyclic group or a polysiloxane group, $R^3$ is a divalent organic group, $R^4$ is

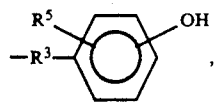

a hydrogen atom or a monovalent organic group, $R^5$ is a hydrogen atom or a monovalent organic group, m is independently 1 or 2, n is independently 0 or 1, and m and n meet the relationship $1 \leq m+n \leq 2$, (b) a photopolymerization initiator or a sensitizer in an amount of from 0 to 20% by weight based on the weight of said photosensitive polymer, (c) a azide compound in an amount of from 0.1 to 50% by weight based on the weight of said photosensitive polymer, and (d) a compound having a carbon-carbon double bond in an amount of from 0 to 10% by weight based on the weight of said photosensitive polymer.

2. A photosensitive polymer composition according to claim 1 wherein the concentration of said photosensitive polymer in said composition is 2 to 50% by weight.

3. A photosensitive polymer composition according to claim 1 wherein the concentration of said photosensitive polymer in said composition is 10 to 30% by weight.

4. A photosensitive polymer composition according to claim 1 further including up to 10% of a crosslinking auxiliary.

5. A photosensitive polymer composition according to claim 1, further including a dye or a pigment.

6. A photosensitive polymer composition according to claim 1 wherein $R^1$ is derived from 3,3',4,4'-benzophenonetetracarboxylic dianhydride.

7. A photosensitive polymer composition according to claim 1 wherein $R^1$ is derived from pyromellitic dianhydride.

8. A photosensitive polymer composition according to claim 1 wherein $R^1$ is derived from diphenylsulfone-3,3',4,4'-tetracarboxylic dianhydride.

9. A photosensitive polymer composition according to claim 1 wherein $R^1$ is derived from trimellitic anhydride.

10. A photosensitive polymer composition according to claim 1 wherein $R^2$ is derived from 4,4'-diaminophenyl ether.

11. A photosensitive polymer composition according to claim 1 wherein $R^2$ is derived from bis[4-(4-aminophenoxy)phenyl] sulfone.

12. A photosensitive polymer composition according to claim 1 wherein $R^2$ is derived from 1,4-bis(4-aminophenoxy)benzene.

13. A photosensitive polymer composition according to claim 1 wherein $R^2$ is derived from 2,2-bis[4-(4-aminophenoxy)phenyl]propane.

14. A photosensitive polymer composition according to claim 1 wherein said azide compound is 2,6-di(p-azidobenzal)-4-methylcyclohexanone.

15. A photosensitive polymer composition according to claim 1 wherein said azide compound is 2,6-di(p-azidobenzal)-cyclohexanone.

16. A photosensitive polymer composition according to claim 1 wherein said compound having a carbon-carbon double bond is trimethylolpropane trimethacrylate.

17. A photosensitive polymer composition according to claim 1 wherein said carbon-carbon double bond is pentaerythritol triacrylate.

18. A photosensitive polymer composition according to claim 1 wherein the azide compound is a diazido compound.

* * * * *